(12) United States Patent
Picco et al.

(10) Patent No.: US 6,915,820 B2
(45) Date of Patent: Jul. 12, 2005

(54) AUTOMOTIVE FLUID TUBING, ESPECIALLY FOR FUEL AND HYDRAULIC FLUID

(75) Inventors: Pierluigi Picco, Recco Genua (IT); Gregory John Scarrow, Marysville, MI (US)

(73) Assignee: Ti Automotive (Fuldabruck) GmbH, Fuldabruck (DE)

( * ) Notice: Subject to any disclaimer, the term of this patent is extended or adjusted under 35 U.S.C. 154(b) by 47 days.

(21) Appl. No.: 10/228,174

(22) Filed: Aug. 26, 2002

(65) Prior Publication Data

US 2004/0035486 A1 Feb. 26, 2004

(51) Int. Cl.⁷ ................................................. F16L 9/14
(52) U.S. Cl. .................... 138/142; 138/143; 138/146; 138/171; 428/39.91
(58) Field of Search .......................... 138/142, 143, 138/146, 171; 428/36.91

(56) References Cited

U.S. PATENT DOCUMENTS

| | | | |
|---|---|---|---|
| 5,182,074 A | * | 1/1993 | Yoshioka et al. ............. 266/87 |
| 5,590,691 A | * | 1/1997 | Iorio et al. ................... 138/146 |
| 5,662,145 A | * | 9/1997 | Stagg ........................ 138/171 |
| 5,867,883 A | * | 2/1999 | Iorio et al. ..................... 29/460 |
| 5,972,450 A | * | 10/1999 | Hsich et al. ............... 428/35.9 |
| 6,003,562 A | * | 12/1999 | Iorio et al. ................... 138/138 |
| 6,245,183 B1 | * | 6/2001 | Iorio et al. ............. 156/244.14 |
| 6,267,148 B1 | * | 7/2001 | Katayama et al. .......... 138/137 |
| 2002/0005223 A1 | * | 1/2002 | Campagna et al. ......... 138/146 |

* cited by examiner

Primary Examiner—James Hook
(74) Attorney, Agent, or Firm—Herbert Dubno

(57) ABSTRACT

An automotive fluid tubing, especially for gasoline, diesel fuel or hydraulic fluid, and composed of metal can be provided with a tube coating of aluminum and then a polyamide 12 layer which is extruded onto the aluminum coating. The polyamide extruded layer greatly improves the wear-resistance and corrosion-resistance of the tubing.

19 Claims, 2 Drawing Sheets

AUTOMOTIVE FLUID TUBING, ESPECIALLY FOR FUEL AND HYDRAULIC FLUID

FIELD OF THE INVENTION

Our present invention relates to an automotive vehicle tubing intended especially for use with liquids common in automotive applications such as fuel (gasoline or diesel fuel) and hydraulic fluid such as brake fluid. More particularly, the invention relates to tubing for such purposes wherein a metallic inner tube has an aluminum tubing and a polyamide layer on such coating.

BACKGROUND OF THE INVENTION

Automotive vehicle tubing of the type described is designed to minimize corrosion and abrasive wear and, therefore, to be capable of use where the tubing is exposed to the elements, for example, on the underside of a vehicle chassis.

The aluminum coating may additionally have a chromate coating between the polyamide layer and the aluminum and in the past the polyamide or nylon coating has been composed of polyamide-11 (nylon-11) applied as a powder coating. In practice it has been found that the corrosion-resistance and abrasion-resistance of such tubing can be further improved.

OBJECTS OF THE INVENTION

It is, therefore, the principal object of the present invention to provide an improved automotive vehicle tubing, especially for use with automotive vehicle fuels and hydraulic fluids in which the corrosion-resistance and abrasion-resistance are enhanced.

Another object of this invention is to provide a tubing for the purposes described but which is free from drawbacks of earlier composite tubing.

SUMMARY OF THE INVENTION

These objects are achieved, in accordance with the invention, by providing a polyamide or nylon layer of polyamide-12 or nylon 12 which is extruded onto the aluminum coating. More particularly, the automotive fluid tubing of the present invention can comprise:

a metallic inner pipe;

an aluminum coating on an exterior of the inner pipe; and a polyamide-12 layer extruded onto and bonded to the aluminum coating.

The term "polyamide-12" is used here interchangeably with nylon 12.

Surprisingly, the combination of an aluminum coating on the metallic inner pipe and a polyamide-12 layer extruded onto and around the aluminum coating can provide a substantially better abrasion-resistance than has been obtainable heretofore. Indeed, tests have shown that with automotive vehicle tubing of the invention an improvement in abrasion-resistance by at least 30% can be obtained.

The inner pipe can be composed of steel and can be fabricated in a simple manner, e.g. by rolling a steel strip through 360° and welding the abutment edges together with a longitudinal butt-weld seam. Alternatively, a doubly rolled inner pipe can be fabricated in which the strip is rolled through 720° and where two turns of the rolled pipe are joined by soldering. The metallic inner pipe can have a wall thickness of 0.2 to 8 mm, preferably 0.4 to 1.5 mm.

According to a feature of the invention the aluminum coating is a hot-dip aluminum coating formed by passing the metal pipe through an aluminum melt which completely wets the external surface of the inner pipe. Excess melt is blown off by gas jet and the layer thickness of the hot-melt aluminum coating is controlled to be 50 to 200 $\mu$m, preferably 100 to 140 $\mu$m.

The polyamide-12 layer can also include substances for enabling the electrostatic bonding thereof at its inner side to the outer surface of the tube and the additives for that purpose can include conductive carbon black, graphite fibers and/or carbon fibers. The polyamide-12 layer should have a thickness of 50 to 200 $\mu$m, preferably 100 to 140 $\mu$m.

According to a further feature of the invention, the aluminum coating can be provided with a chromium-free surface treatment layer, especially a phosphatizing coating and/or a primer coating which will be disposed between the aluminum coating and the polyamide-12 layer. These coatings increase the corrosion and wear-resistance and particularly improve the adhesion of the polyamide-12 layer to the metal pipe.

The chromium-free surface treatment coating can have a thickness of 0.2 to 0.8 $\mu$m and is preferably small than 0.5 $\mu$m. The primer coating can have a thickness of 1 to 8 $\mu$m, preferably 3 to 5 $\mu$m. Because the product may be subject to mechanical and thermal stress when in place and when being installed in an engine compartment or on the underside of the chassis, and to reduce noise produced by the tubing, on the outer side of the polyamide-12 layer a protective layer of a thermoplastic elastomer or polypropylene can be applied. The coating can have a thickness of 1 to 3 mm, preferably 1.5 to 2 mm.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
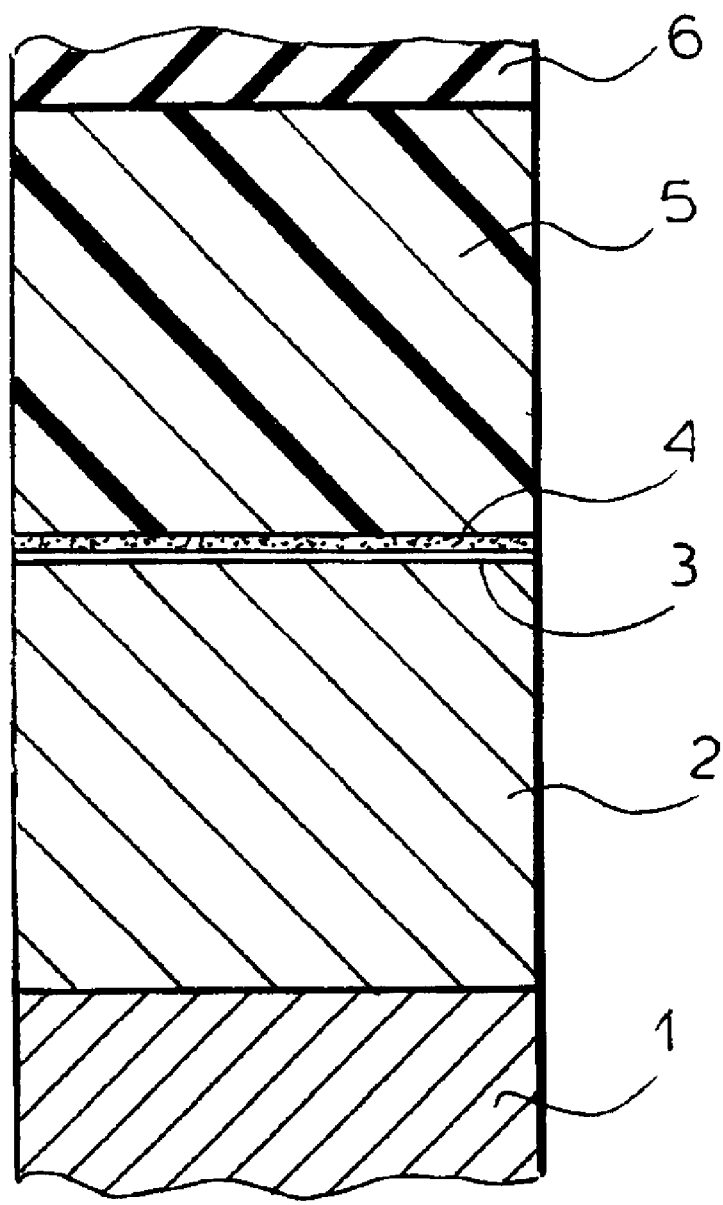
FIG. 1 is a cross sectional view through the various layers of a tubing for fuel or hydraulic fluid in an automotive vehicle.

From FIG. 1 it will be apparent that the metallic inner pipe 1, namely, a steel pipe in the form of a simply rolled and longitudinally seen pipe with a butt-weld seam, an outer diameter of 4.68 mm and a wall thickness of 0.7 mm can form the inner member of the automotive fluid tubing.

On the outer side of this inner pipe 1 a hot-dipped aluminum coating 2 of a thickness of about 120 $\mu$m is applied. On the aluminum coating 2 a chrome-free surface treatment layer 3 in the form of a phosphate coating is applied with a thickness of say 0.4 $\mu$m on the phosphate coating 3, a 5 $\mu$m thick primer coating 4 of a commercial nylon primer is applied. A polyamide-12 layer 5 of 120 $\mu$m is extruded onto the primer coating and can be covered by a protective layer of a thickness of about 2 mm of a thermoplastic elastomer or polypropylene. This layer is designated as 6.

Figure 3:
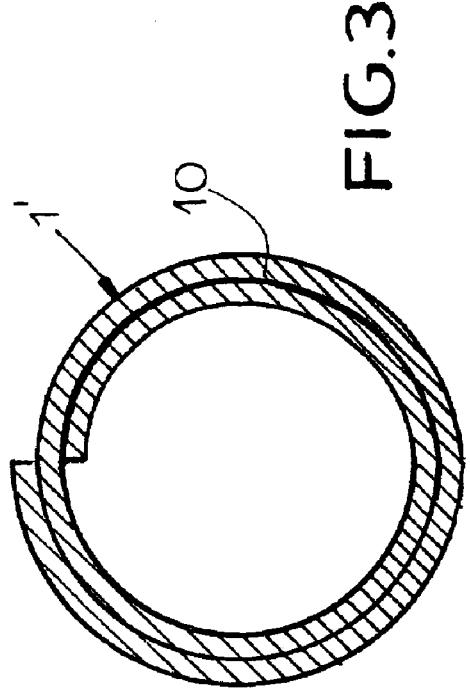
FIG. 3 is a cross sectional view through the inner pipe in accordance with a second embodiment.
Figure 2:
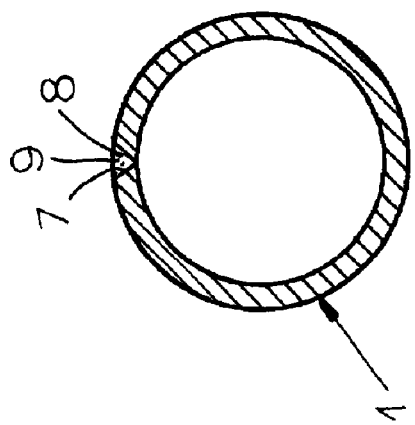
FIG. 2 is a cross sectional view through the inner metal pipe in accordance with one embodiment of the invention.

FIG. 2 shows that the pipe 1 can be bent from a steel strip so that its edges 7, 8 are juxtaposed to allow a longitudinal weld seam 9 to be formed between the edges. Alternatively, the steel pipe 1' (FIG. 3) may be made by rolling the strip through, say, 720° and providing a solder layer 10 between the turns.

Figure 4:
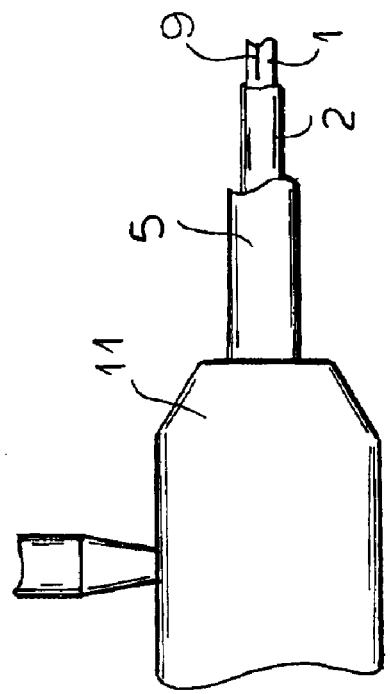
FIG. 4 is a side elevational view illustrating the extrusion of the polyamide-12 layer onto the aluminum coated metal pipe.

As can be seen in FIG. 4, the pipe is passed through an extruder head 11 to enable the polyamide layer 5 to be extruded therearound.

We claim:

1. An automotive-fluid tubing comprising:
   a metallic inner pipe;
   a hot dip aluminum coating having a thickness of 50 $\mu$m to 200 $\mu$m on an exterior of said inner pipe;
   a polyamide-12 layer extruded onto and bonded to the aluminum coating; and
   a primer layer of a thickness of 1 to 8 $\mu$m between said aluminum coating and said polyamide-12 layer and bonding said polyamide-12 layer to said aluminum coating.

2. The automotive-fluid tubing defined in claim 1 wherein said inner pipe is a steel pipe.

3. The automotive-fluid tubing defined in claim 1 wherein said metallic inner pipe is a rolled pipe having a welded longitudinal seam between butting edges.

4. The automotive-fluid tubing defined in claim 1 wherein said metallic inner pipe is a doubly rolled pipe having solder extending around said pipe between layers thereof.

5. The automotive-fluid tubing defined in claim 1 wherein said metallic inner pipe has a wall thickness of 0.2 to 8 mm.

6. The automotive-fluid tubing defined in claim 5 wherein said wall thickness is 0.4 to 1.5 mm.

7. The automotive-fluid tubing defined in claim 1 wherein said thickness is 100 to 140 $\mu$m.

8. The automotive-fluid tubing defined in claim 1 wherein said polyamide-12 layer contains a conductive additive rendering said polyamide-12 layer electrically conductive.

9. The automotive-fluid tubing defined in claim 1 wherein said polyamide-12 layer has a thickness of 50 to 200 $\mu$m.

10. The automotive-fluid tubing defined in claim 9 wherein said thickness of said polyamide-12 layer is 100 to 140 $\mu$m.

11. The automotive-fluid tubing defined in claim 1 wherein a chromium-free surface-treatment layer is provided between primer layer and said aluminum coating.

12. The automotive-fluid tubing defined in claim 11 wherein said chromium-free surface-treatment layer is a phosphatization coating.

13. The automotive-fluid tubing defined in claim 11 wherein said chromium-free surface-treatment layer has a thickness of 0.2 to 0.8 $\mu$m.

14. The automotive-fluid tubing defined in claim 13 wherein said chromium-free surface-treatment layer has a thickness which is smaller than 0.5 $\mu$m.

15. The automotive-fluid tubing defined in claim 11 wherein said primer layer has a thickness of 3 to 5 $\mu$m.

16. The automotive-fluid tubing defined in claim 1, further comprising a protective layer of a thermoplastic elastomer or of polypropylene on an outside of said polyamide-12 layer.

17. The automotive-fluid tubing defined in claim 16 wherein said protective layer has a thickness of 1 to 3 mm.

18. The automotive-fluid tubing defined in claim 17 wherein said thickness of said protective layer is 1.5 to 2 mm.

19. A method of making an automotive-fluid tubing for brake fluid or hydraulic fluid, comprising the steps of:
   (a) forming a metallic inner pipe of a wall thickness of 0.2 to 8 mm by rolling and butt-welding rolled edges to form a longitudinal seam or doubly rolling the metallic inner pipe and applying solder around said pipe and between layers thereof;
   (b) hot dip coating said metallic inner pipe to form an aluminum coating of a thickness of 50 to 200 $\mu$m thereon;
   (c) applying a primer layer of a thickness of 1 to 8 $\mu$m to said aluminum coating;
   (d) extruding onto said at least one intervening layer a 50 to 200 $\mu$m thick layer of polyamide-12; and
   (e) applying to the layer of polyamide-12 a 1 to 3 mm thick protective layer of a thermoplastic elastomer or a polypropylene.

\* \* \* \* \*